Nov. 24, 1959 N. C. CLARK 2,914,703
PHASE SEQUENCE SENSITIVE CIRCUITS
Filed March 30, 1953 4 Sheets-Sheet 1

INVENTOR.
NATHAN C. CLARK
BY
*George C. Sullivan*
Agent

Nov. 24, 1959  N. C. CLARK  2,914,703
PHASE SEQUENCE SENSITIVE CIRCUITS
Filed March 30, 1953  4 Sheets-Sheet 3

INVENTOR.
NATHAN C. CLARK
BY
George C. Sullivan
Agent

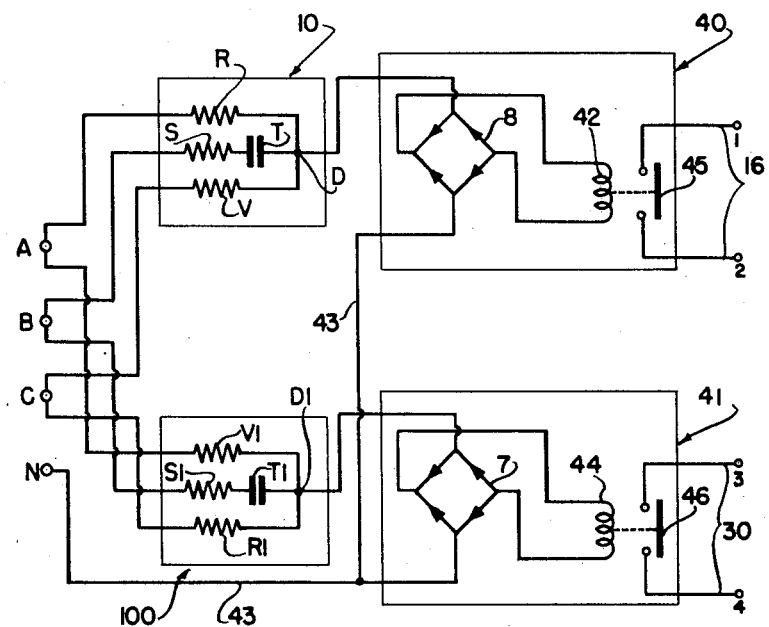

![United States Patent Office logo] United States Patent Office

2,914,703
Patented Nov. 24, 1959

2,914,703

PHASE SEQUENCE SENSITIVE CIRCUITS

Nathan C. Clark, Los Angeles, Calif., assignor to Lockheed Aircraft Corporation, Burbank, Calif.

Application March 30, 1953, Serial No. 345,652

1 Claim. (Cl. 317—48)

This invention relates to devices or circuits for sensing phase sequence conditions of poly-phase systems and relates more particularly to circuits for sensing and responding to reversed or "negative" phase sequence and/or to unreversed or "positive" phase sequence of three-phase A.C. systems.

In the three-phase circuits as employed in certain aircraft and elsewhere, it is important that the positive phase sequence, that is the intended or designed phase sequence be maintained at all times. For example, in the event the phase sequence of such a system is for any reason reversed, that is made "negative," the direction of rotation of the various motors energized by the system will be reversed, the direction of rotation of poly-phase motors depending solely upon the time sequence of the voltages applied to their phase windings. In the case of aircraft electrical systems such accidental reversal of motor rotation caused by reversed (negative) phase sequence may result in serious consequences. Doors and ports will open instead of close, control surfaces and valves will move in the opposite direction from that intended, and limit switches will malfunction causing damage or destruction of the motors, actuators and actuated parts. The phase sequence of such a system may accidentally be reversed in the operation of double throw or interlocking contactors or by inadvertent reversal of the power source, as by incorrectly connecting a motor-alternator set on the input side, thereby resulting in reverse rotation and consequent reverse sequence of the output phase voltages, or by other means.

Devices or circuits have been introduced for indicating reversed or negative phase sequence but operate on a very narrow band of frequencies and are merely indicators producing insufficient change in current when the phase sequence changes to actuate a relay or other device. Another type of phase sequence responsive device has recently been introduced which is basically a three-phase torque motor having a spring restrained rotor which closes contacts after a given angular displacement depending upon phase sequence. This latter type of device is heavy, expensive to operate and produces considerable heat.

It is an object of the present invention to provide a simple, practical and dependable device or circuit for detecting phase sequence reversal which is operable with systems having frequencies variable over wide ranges.

Another object of the invention is to provide a phase sequence responsive device that is light in weight, inexpensive to manufacture and operate and that produces sufficient current change in the event of a negative phase condition developing, to dependably operate relays, switches, etc. for protecting the affected equipment and to produce adequate signals or indications of the condition.

Another object of the invention is to provide a phase sequence responsive circuit or device that will not only operate satisfactorily over a wide range of applied frequencies but will also perform satisfactorily at a substantial range of line-to-neutral voltages and is unaffected by voltage unbalance between the phases, by substantial temperature variation or by vibration. These characteristics of the circuit or device well suit it for aircraft applications.

Another object of the invention is to provide a phase sequence sensitive or responsive device that does not embody or require moving or wearing parts such as shafts, bearings, brushes, or the like. Except for the relay contractors, etc. that may be required for given embodiments and applications of the invention the device or circuit does not include moving parts subject to wear or failure.

A further object of the invention is to provide a phase sequence responsive device characterized by a simple resistor-reactor network which operates to sense and respond to a reversed or negative phase condition in accordance with four electrical principles:

(1) Locus of the vector representing the current in a series circuit made up of a fixed resistance and a variable reactance is a semi-circle passing through the origin of the current vector and with the diameter coincident with the vector representing the applied voltage.

(2) The phase position and magnitude of the current in a resistance reactive series circuit vary only slightly with substantial changes in frequency when selected circuit parameters are employed.

(3) The effect of reversal of phase sequence on the vector diagram representing a poly-phase system is to exchange the angular directions taken as leading and lagging. The application in the case of the present invention is that a reversal of phase sequence shifts the locus of the current vector as explained in principle number 1 to the opposite semi-circle. Thus with the reactance chosen as capacitive if positive phase sequence is taken as clockwise the semi-circle representing the locus of the current vector will be in a position counter clockwise from the vector representing the total applied voltage whereas if the phase sequence is reversed or counter clockwise the locus of the current vector will be the semi-circle that is located clockwise from the total voltage vector.

(4) The current in a purely resistive circuit is independent of frequency and phase sequence and is precisely in phase with the corresponding applied voltages.

The present invention provides a resistance-reactance network which utilizes these four phenomena or principles to sense and respond to reversed or negative phase sequence, the network while requiring a minimum of power for its operation supplies ample change of current to dependably operate a relay, or the like, for the actuation of appropriate signals or indications, for the actuation of corrective or protective devices, or for other purposes.

Other objectives of my invention will become apparent from the following detailed description of typical preferred embodiments throughout which reference will be made to the accompanying drawings wherein:

Figure 6 is a wiring diagram of a circuit of the invention employed with a three-wire input, a network which derives a neutral from the three-wire input, and also incorporating a rectifier type relay for a control or protective circuit, or the like;

Figure 11 is a wiring diagram of a device of the invention incorporating two networks and two relays controlled thereby.

Figure 1:
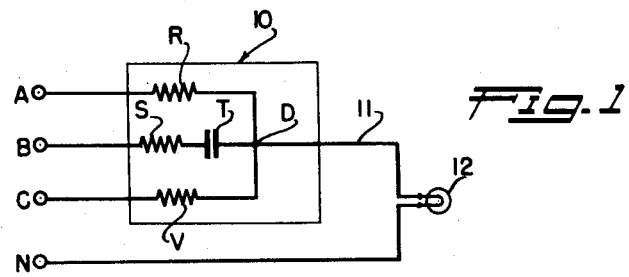
Figure 1 is a wiring diagram of a network or circuit of the invention as utilized to energize a lamp or relay.
Figure 2:
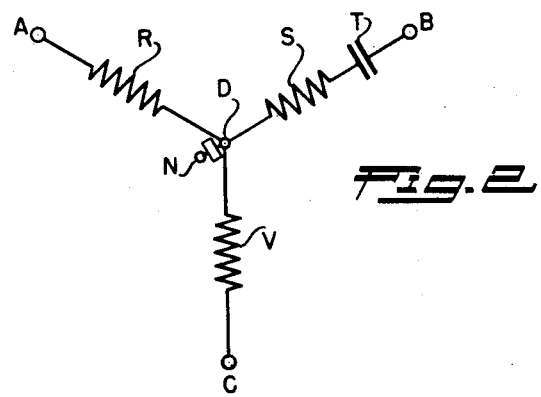
Figure 2 is a schematic diagram of the circuit illustrated in Figure 1.

In Figures 1 and 2 the three line wires and neutral of a typical four wire three-phase electrical system are designated by the characters A, B, C and N respectively. The system may carry current of practically any voltage and of practically any frequency. In Figure 2 the point D is the common junction of the three branches or legs AD, BD and CD of the circuit connected in star. A line 11 extends from the junction point D to the neutral line N and the device or unit to be operated or energized is interposed in the line 11. In the simple case illustrated this device is in the form of an incandescent lamp 12, it being apparent that other electrically energized devices may be employed instead of or in addition to the lamp.

Figure 3:
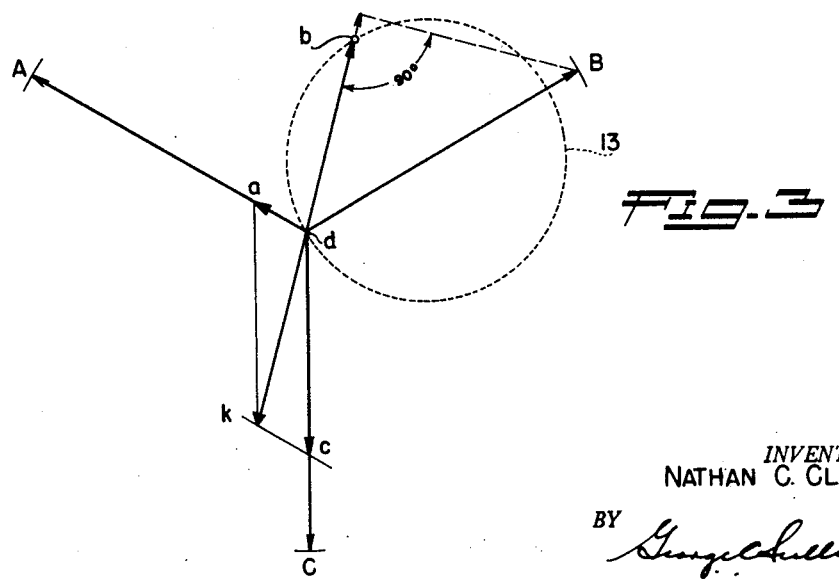
Figure 3 is a vector diagram illustrating the values and conditions that prevail when the phase sequence is positive or normal.

The network 10 of the invention includes a resistance R in the leg AD, a resistance S in the leg BD, a resistance V in the leg CD and a condenser T in the leg BD. I prefer to have the leg BD include a capacitor rather than an inductive reactance because of the lesser cost and weight. If an inductive reactance is used, instead, the basic principles of operation of the circuit remain the same. The currents in the branches or legs AD and CD are in phase with the voltages of the legs AD and CD and the current in leg BD leads the voltage of the leg BD by an angle determined by the ratio of the resistance of resistor S to the reactance of condenser T. Referring now to Figure 3, this is represented vectorially where current through leg DB is shown as the vector $db$. In this same Figure 3 the currents through the legs AD and CD are represented by the vectors $da$ and $dc$ respectively. The currents of $da$ and $dc$ are determined by the values of their respective resistors and the corresponding voltages which are substantially constant. In accordance with the invention the values of resistors R and V are so chosen for the particular intended operating frequency and phase sequence that the vector sum $dK$ of their currents $da$ and $dc$ is equal to and opposite to the current $db$ (see Figure 3). Thus under normal positive or unreversed phase sequence operating conditions there is little or no current flow to neutral, D to N in Figure 2. In this connection it should be observed that because the phase position and magnitude of the current in the resistance-capacitance series circuit are not changed greatly even with wide variations in frequency, such variations do not move point $b$ more than a few degrees about the circle 13 of the vector locus. In practice variations in frequency from one half to twice the normal line value (over a range of 4 to 1) will move point $b$ along circle 13 by a distance less than one third of the diameter of the circle and therefore will result in only a correspondingly small current flow to neutral N. The relay or other sensing device can be so chosen or constructed as not to respond to this small amount of current. Thus the network is substantially insensitive to frequency variations.

Figure 4:
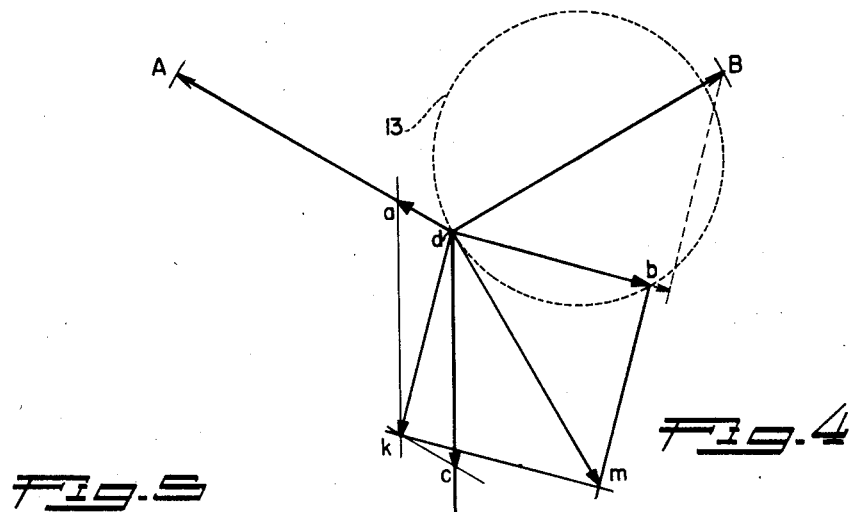
Figure 4 is a vector diagram similar to Figure 3 illustrating the conditions that prevail when the phase sequence is reversed or made negative.

When, for any reason the phase sequence of the circuit ABC is reversed, the vector diagram of the network takes a form such as shown in Figure 4. The relationships between the voltages and currents in each phase are changed in accordance with "principle No. 3" previously explained, and the currents add up vectorially to produce a different sum or total, the sum being equal to the neutral current. Thus referring to Figure 4 the current A to D of Figure 2 is still represented by the vector $da$, the current C to D is represented by the vector $dc$ and the current B to D is represented by the vector $dc$ and the current B to D is represented by the vector $db$. However, in the vector diagram of Figure 4 representing a negative or reversed phase sequence condition of the line circuit, the total of $da$ and $dc$ is $dK$ as before but $dK$ and $db$ are now no longer 180° out of phase and although they may be equal their sum is now $dm$ which is substantial and far from zero. Thus there is the passage of substantial current from D to N, Figures 1 and 2, for the excitation or energization of the lamp 12, or other device in the line 11 extending to neutral N. At the normal line frequency this current is three or more times as great as the current sent to the neutral when the phase sequence is normal or unreversed and when the frequency is any value from one half to twice the normal value. In practice variations in frequency from one half to twice the normal line value (over a range of 4 to 1), while the phase sequence is reversed or negative, will move the point $b$ along the circle only far enough to decrease the current flow to neutral by one tenth, or less, of its value at the normal line frequency.

From the foregoing it will be seen that so long as the phase sequence of the line system or circuit ABC remains positive, that is unreversed, little or no current flows through line 11 to the lamp 12 and neutral N, even though the frequency and/or voltage may vary substantially and therefore the lamp is neither excited nor energized. However, upon a change or reversal of the phase sequence in the three-phase system ABC the sum of the vectors $da$, $dc$ and $db$, Figure 4, provides for the passage of substantial current through DN, Figure 2, that is through line 11 to neutral N to energize the lamp 12 or other device. The relative values of the resistors R, S and V, and the related value of the condenser T assure or effect the above described operation of the network or circuit. The resistors R, S, and V are of such magnitude of resistance as to pass the amount of current required by the chosen lamp or relay, and these resistances are approximately in such ratios as to cause the vector relations to exist as described above. The resistance of the resistor S is such that when it is connected to a voltage equal to the line-to-neutral voltage of the three-phase system for which the network is designed to be used, a current will flow through it equal to the current which the network is required to deliver to the lamp when the phase sequence is negative and the frequency is the normal or design value. The resistance of the resistor V should theoretically be 1.26 times the resistance of the resistor S; the resistance of the resistor R should theoretically be 4.71 times the resistance of the resistor S; and the capacitance of the capacitor T, or the inductance of the inductor if one is used instead of a capacitor, should theoretically be such as to produce a reactance equal in numerical value to the resistance of the resistor S when the frequency is approximately the normal or design value. If the device is to be used at various frequencies over a range, then the frequency described herein as "normal" is the geometric mean of the highest and lowest frequencies included in the range of desired operation.

In practice the numerical values of resistors and the capacitor may differ from the theoretical values because of the following: (1) It may be necessary to adapt the device to an A.-C. voltage wave containing harmonics, (2) if the device is required to operate over an extreme range of temperature it is necessary to use resistors and a capacitor which will have satisfactory values over such a temperature range, which may involve selection to compensate for non-linearity with temperature, (3) the resistors and the capacitor may preferably be of commercially-available ratings, (4) it may be desirable for purposes of standardization, maintenance, or other reasons to use a lamp 12 or relay having a higher voltage drop when excited than that value used in the normal application, thereby slightly modifying the vector diagram (Figure 3) and thus requiring resistance ratios that differ slightly from the theoretical values, and (5) other practical considerations which might arise from problems of manufacture or application of the device.

The following table indicates the theoretical values for the above described circuit and the actual or practical values for the circuit when used with a typical relay and with a typical lamp, it being understood that the invention is not to be construed as necessarily limited to these typical applications or values. The values of the following table are for a phase sequence that is positive when it is from the lowest resistance terminal to the intermediate resistance branch and thence to the highest resistance branch, that is BCA or ABC.

positive when it is from the lower-resistance terminal toward the higher-resistance terminal, that is ABC.

| Circuit Element | Theoretical Values | | |
|---|---|---|---|
| | Definition | For 120 v., 520 cy. | For 8 m.a. Relay | For 53 m.a. Lamp |
| Resistance of Lower-resistance branch (S) (ohms). | $\frac{\sqrt{3}}{2}R$ or $0.866\frac{E}{i}$ | $\frac{104}{i}$ | 13,000 | 1,960 |
| Resistance of Higher-resistance branch (V) (ohms). | $\sqrt{3}R$ or $1.732\frac{E}{i}$ | $\frac{208}{i}$ | 26,000 | 3,920 |
| Series Capacitance of Lower-resistance branch (T) (microfarads). | $\frac{10^6 i}{3\pi fmE}$ or $\frac{10600i}{fmE}$ | $1.70i$ | 0.0136 | 0.090 |
| Series Inductance of Lower-resistance branch, if used instead of capacitance (henries). | $\frac{3E}{4\pi fmi}$ or $\frac{0.239E}{fmi}$ | $\frac{0.055}{i}$ | 6.9 | 1.04 |

$E$=voltage from line to neutral.
$i$=current to be supplied to load when any is supplied.
$fm$=geometric mean frequency of the frequency-band to be used.

$$fm = \sqrt{\text{maximum frequency} \times \text{minimum frequency}}$$

$$R = \frac{E}{i}$$

If an inductance is used instead of a capacitance, the network will deliver current to the lamp or relay when the phase sequence is opposite to that which causes the capacitance-type network to deliver current, that is ACB.

When the phase sequence of the line voltages of the electrical system is positive or normal, the network delivers little or no current to neutral; whereas when the phase sequence is negative or reversed, the network

| Circuit Element | Theoretical | | | For 8 ma. Load (Relay) | | | For 53 ma. Load (Lamp) | | |
|---|---|---|---|---|---|---|---|---|---|
| | Definition | Percent | For 120 v., 520 cy. | Theoretical | Actual | Percent | Theoretical | Actual | Percent |
| Resistance of lowest-resistance branch (S) (ohms) | $\frac{E}{i}$ | 100 | $\frac{120}{i}$ | 15,000 | 15,000 | 100 | 2,260 | 2,250 | 100 |
| Resistance of immediate-resistance branch (V) (ohms) | $1.26\frac{E}{i}$ | 126 | $\frac{152}{i}$ | 19,000 | 20,000 | 133 | 2,870 | 3,000 | 133 |
| Resistance of maximum-resistance branch (R) (ohms) | $4.71\frac{E}{i}$ | 471 | $\frac{567}{i}$ | 71,000 | 80,000 | 533 | 10,650 | 15,000 | 667 |
| Series capacitance of lowest-resistance branch (T) (microfarads) | $15,900\frac{i}{fmE}$ | | $2.55i$ | 0.020 | 0.019 | | 0.135 | 0.115 | |
| Series inductance of lowest-resistance branch (if used instead of capacitance) (henries) | $\frac{E}{6.283 fmi}$ | | $\frac{0.0367}{i}$ | 4.6 | | | 0.69 | | |

$E$=voltage from line to neutral.
$i$=current to be supplied to load when any is supplied.
$fm$=geometric mean frequency of frequency-band to be used.

$$fm = \sqrt{\text{maximum frequency} \times \text{minimum frequency}}$$

Figure 8:
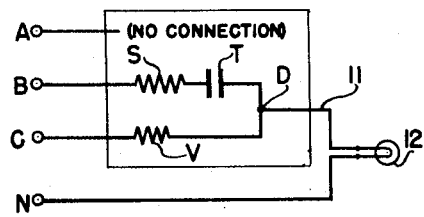
Figure 8 is a wiring diagram similar to Figure 1 showing a network of the invention in two legs or branches of a three-phase system.
Figures 7, 9:
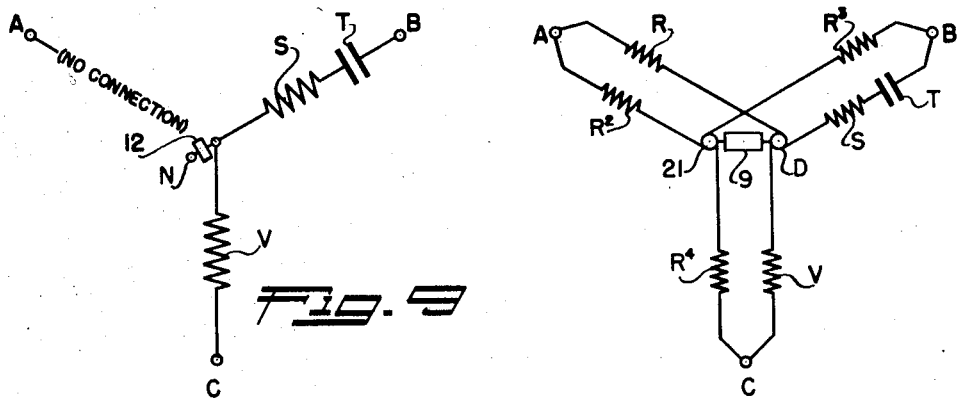
Figure 7 is a diagram of the circuit illustrated in Figure 6.
Figure 9 is a schematic diagram of the circuit of Figure 8.
Figure 10:
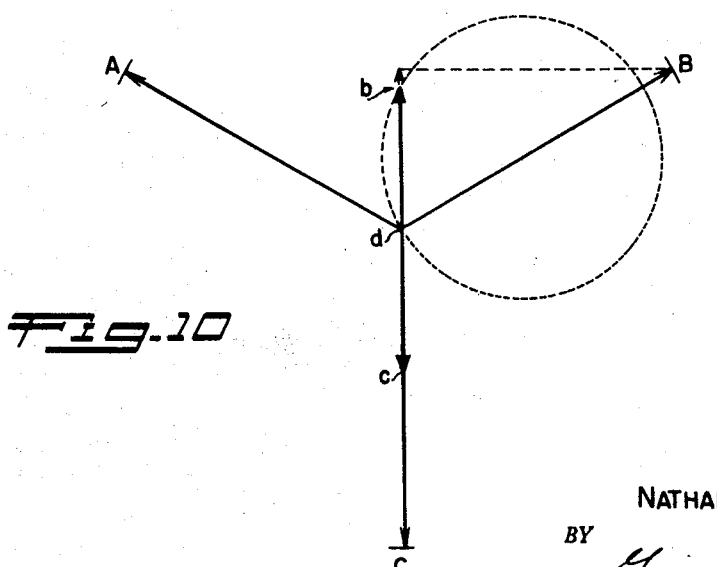
Figure 10 is a vector diagram of the device or circuit of Figure 8 illustrating the conditions that prevail when the phase sequence is positive or normal.

If an inductance is used instead of a capacitance, the network will deliver current to the load when the phase sequence is opposite to that which causes the capacitance-type network to deliver current, that is ACB. The ratios and magnitudes of the resistors S and V and the capacitor T may be varied from the given theoretical values so as to eliminate the necessity for the branch containing resistor R, if a slightly impaired performance can be accepted. Figures 8, 9 and 10 illustrate this network or circuit of the invention where it will be seen that the terminal or line A has no connection, the other parts or components being arranged and connected as shown in Figure 1. This is a satisfactory arrangement for applications in which the variations in frequency or ambient temperature are less extreme than those found in aircraft use.

The following table indicates the theoretical values for such a circuit when used with a typical relay or lamp. The values in this table are for a phase sequence that is delivers a very appreciable current to neutral. This current, or lack of it, controls the brightness of an indicator lamp, or magnetizes a relay, or actuates any other type of responsive device such as a magnetic or electronic amplifier, a resistor, a heater, a chemical solution, etc. which is desired to be so energized or actuated in response to phase sequence only.

The voltages of a three-phase electrical system can be in either of only two sequences, in the same way that the rotation of a wheel can be in one of only two directions. Either sequence can be considered positive, and the other will then be negative. Thus the network of this invention can be arranged to deliver current to neutral with either phase sequence by either properly defining which sequence is positive, or by exchanging the electrical positions of the two resistors which are not in the branch containing the capacitor T.

Figure 5:
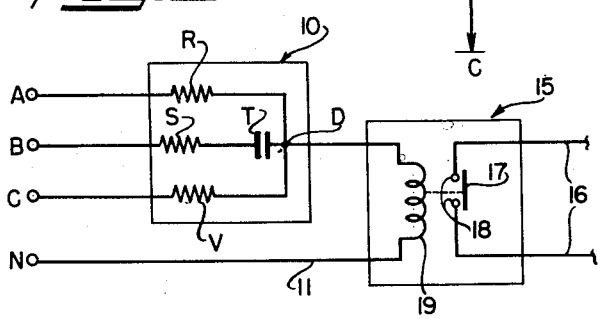
Figure 5 is a wiring diagram of a circuit of the invention as used in a four-wire system and incorporating a relay.

Figure 5 illustrates a device or circuit of the invention incorporating a magnetic relay 15 for controlling a circuit 16. This relay 15 which may be used instead of or in addition to the lamp 12 includes a winding or coil 19 interposed in the line 11 and operating a contactor 17 engageable with stationary contacts 18 in the circuit 16. As illustrated, the network comprising the resistors R, S and V and the condenser T, may be the same as described above, the components of the network bearing the above described ratios or relationships. The circuit 16 may be utilized to operate a remote indicating device for indicating the reversed or changed phase sequence condition in the circuit ABC or may operate a protective device for protecting other equipment against damage as a result of the reversed phase sequence condition or, in fact, may be employed for any purpose whatsoever. The relay 15 may be spring biased, which is conventional, and may be such that its contactor 17 closes against the contacts 18 when the coil 19 is energized or may be such that the coil 19 when energized serves to open the contactor 17 and circuit. The relay 15 may be an alternating-current relay, as shown, or may be a rectifier-type relay comprising any type of rectifier with its input terminals connected to points D and N and its output connected to the terminals of the operating coil of a common direct-current relay.

Figure 6:
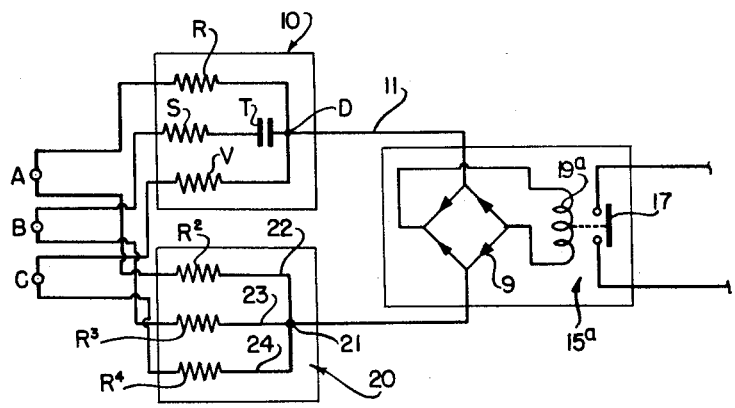

Figures 6 and 7 illustrate a device or circuit of the invention for use with a three-wire three-phase A.C. input A, B and C that is a three-phase system that has no neutral line. In this device the network 10 may be the same as above described incorporating the resistors RS and V connected respectively with the lines A, B and C and the condenser T connected in the line B. In this case the wire or line 11 extends from the junction D to a suitable rectifier 9 and thence to a resistance network 20. The winding 19$^a$ of the direct current relay 15$^a$ is in turn connected with the rectifier 9 to be controlled by the network. The network 20 serves to establish the neutral from the input lines A, B and C. The network 20 includes a common junction 21 to which the line 11 is connected and three legs or branches 22, 23 and 24 extending from the junction 21 to the input lines A, B and C respectively. Resistors $R^2$, $R^3$ and $R^4$ are interposed in the branches 22, 23 and 24. These resistors $R^2$, $R^3$ and $R^4$ are of equal resistance ratings and power ratings; and their connection or interposition between the line 11 and the three-phase input lines A, B and C serves to supply the neutral for the network 10. The three legs of the network 20 are equal to each other in both impedance and power factor, but need not necessarily be pure resistors; they may contain any desired or convenient combination of resistance, capacitance, and inductance. In Figure 7, which is in the nature of a star wiring diagram, it will be seen how the resistors $R^2$, $R^3$ and $R^4$ are, in effect, connected between the neutral junction 21 and their respective input lines A, B and C while the resistors R, S and V and the condenser T are connected between the junction D and the input lines A, B and C with the rectifier 9 of the relay 15$^a$ interposed between the junctions D and 21. The device or circuit of Figures 6 and 7 operates in substantially the same manner as the circuit of Figure 5. The network 10 is responsive or sensitive to the sequence of the three-phase voltages and so long as this sequence remains positive or unreversed substantially no current flows to the relay coil 19$^a$ regardless of substantial fluctuations in the frequency or voltage. However, if the sequence or the phases changes or becomes reversed a substantial current is delivered to the relay 15$^a$ and the contactor 17 is actuated, the network 20 providing the necessary neutral for the system or device.

Figure 11 of the drawings illustrates a device of the invention that operates to either open or close one circuit 16 when a "positive" phase condition exists, that operates to either open or close a second circuit 30 when a negative or reversed phase sequence condition exists and that is static or idle when no voltage is applied by the lines A, B and C. It will be apparent that either of the two possible phase sequences of a three-phase system may be considered as normal or "positive" and employed to operate the motors, etc. of the energized circuit as intended. Furthermore, it will be seen from the foregoing description that by interchanging the resistors R and V in a given network 10, that network may be made to respond to either one of the two possible phase sequence relations. Again the relays operated by the networks on the invention may be of the normally open type or of the normally closed type. The device of Figure 11 includes two networks 10 and 100, one operating to complete the circuit 16 when the phase sequence of the applied voltages is what may be considered "positive," the other operating to complete the circuit 30 when the phase sequence of the applied voltage is what may be considered negative or reversed, it being again noted that the expressions "positive" and "unreversed" and "negative" or "reversed" depend entirely upon the intended or operating phase required. I have shown the network 10 arranged to operate a relay 40 in the circuit 16 through the medium of a suitable rectifier 8 and the network 100 arranged to operate a relay 41 in the circuit 30 through the medium of rectifier 7. The network 10 may be the same as above described including the resistors R, S and V connected in the lines A, B and C respectively, and the condenser T connected in the line B, the network having the common junction D. The ratios between the values of the resistors R, S and V and the relative value of the condenser T are the same as above described and this network will be considered as operable to supply current to the relay 40 for controlling the circuit 16 when the phase sequence of the input voltages from the lines A, B and C is "positive." The second network 100 is similar to the network 10 having three resistors $R^1$, $S^1$ and $V^1$ and a condenser $T^1$ connected with the input lines A, B and C and having a common junction $D^1$ of the lines. However, in this network 100 the resistor $V^1$ is connected with the line A, the resistor $S^1$ is connected with the line B and the resistor $R^1$ is connected with the line C, the condenser $T^1$ being connected in line B. It will be seen that with this relation of the resistors $R^1$, $S^1$ and $V^1$, which resistors may have the same values as the resistors R, S and V respectively, the network 100 operates to supply current to the relay 41 when the phase sequence of the input lines A, B and C is reversed or "negative." The rectifier 8 for exciting the winding or coil 42 of the relay 40 is connected between the junction D of the network 10 and a line 43 extending to the neutral N and the rectifier 7 that excites the coil 44 of the relay 41 is connected between the junction $D^1$ of the network 100 and the neutral lead 43. I have shown the contactors 45 and 46 of the relays 40 and 41 respectively of the type that remain open until actuated so that the circuit 16 is open until a positive phase sequence of the input causes the network 10 to pass actuating current to the coil 42 and so that the circuit 30 remains open until a negative phase sequence of the applied voltages causes the network 100 to pass actuating current to the coil 44. Thus the device or circuit of Figure 8 remains static or idle when no voltage is applied at the input lines A, B and C. However, the circuit or device of Figure 11 operates to maintain either one of the relays 40 or 41 actuated so long as the three-phase A.C. voltage is applied by the lines A, B and C, the relay 40 being actuated to complete the circuit 16 when the phase sequence is "positive" and the relay 41 serving to complete the circuit 30 so long as the phase sequence is "negative."

Having described only typical forms of the invention

I do not wish to be limited to the specific details herein set forth, but wish to reserve to myself any variations or modifications that may appear to those skilled in the art and/or fall within the scope of the following claim.

I claim:

In combination with a three-phase electrical system; a first line, a second line and a third line each carrying a given phase voltage of the system, two networks each including three legs, each leg having one end terminal connected with a common junction, a current responsive device connected with said junction of one network to respond to current therefrom, a second current responsive device connected with said junction of the other network to respond to current therefrom, the first leg of each network including a resistor and a capacitor connected in series, the second leg of each network including a resistor, and the third leg of each network including a resistor, the other end terminals of the first legs of the two networks being connected with the first line, the other end terminal of the second leg of the first network being connected with the second line, the other end terminal of the third leg of the first network being connected with the third line, the other end terminal of the second leg of the second network being connected with the third line and the other end terminal of the third leg of the second network being connected with the second line, the resistors and capacitors of the networks being related so that the common junction of one network delivers substantial current only when the phase sequence is positive and the common junction of the other network delivers substantial current only when the phase sequence is negative.

References Cited in the file of this patent

UNITED STATES PATENTS

| | | |
|---|---|---|
| 1,826,099 | Stevens | Oct. 6, 1931 |
| 1,963,193 | Evans | June 19, 1934 |
| 1,963,195 | Friedlander | June 19, 1934 |
| 2,482,482 | Harder | Sept. 20, 1949 |
| 2,486,004 | Clark | Oct. 25, 1949 |
| 2,724,782 | Holloway | Nov. 22, 1955 |

FOREIGN PATENTS

| | | |
|---|---|---|
| 382,647 | Germany | Oct. 4, 1923 |
| 822,134 | Germany | Nov. 22, 1951 |